United States Patent
Peterson et al.

(10) Patent No.: US 10,416,759 B2
(45) Date of Patent: Sep. 17, 2019

(54) EYE TRACKING LASER POINTER

(71) Applicant: Lenovo (Singapore) Pte. Ltd., Singapore (SG)

(72) Inventors: Nathan J. Peterson, Durham, NC (US); Russell Speight VanBlon, Raleigh, NC (US); Arnold S. Weksler, Raleigh, NC (US); John Carl Mese, Cary, NC (US); Rod D. Waltermann, Rougemont, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 23 days.

(21) Appl. No.: 14/276,391

(22) Filed: May 13, 2014

(65) Prior Publication Data

US 2015/0331484 A1 Nov. 19, 2015

(51) Int. Cl.
*G06F 3/01* (2006.01)
*G06K 9/00* (2006.01)
*G06F 3/0484* (2013.01)

(52) U.S. Cl.
CPC ............ *G06F 3/013* (2013.01); *G06F 3/0484* (2013.01); *G06F 3/04842* (2013.01); *G06K 9/0061* (2013.01); *G06K 9/00604* (2013.01)

(58) Field of Classification Search
CPC ........ G06F 3/017; G06F 3/013; G06F 3/0484; G06F 3/04842; G06K 9/0061; G06K 9/00604
See application file for complete search history.

(56) References Cited

U.S. PATENT DOCUMENTS

| | | | | |
|---|---|---|---|---|
| 8,745,524 B2* | 6/2014 | Hsu | ............... | G06F 3/011 382/103 |
| 9,143,880 B2* | 9/2015 | Vennstrom | ............... | G06F 3/167 |
| 2006/0112334 A1* | 5/2006 | Endrikhovski | ......... | G06F 3/013 715/700 |
| 2006/0155546 A1* | 7/2006 | Gupta | ............... | G06F 3/038 704/275 |
| 2007/0164990 A1* | 7/2007 | Bjorklund | ............... | G06F 3/017 345/156 |
| 2009/0125849 A1* | 5/2009 | Bouvin | ............... | G06F 3/013 715/863 |
| 2009/0315827 A1* | 12/2009 | Elvesjo | ............... | G06F 3/013 345/157 |
| 2011/0001698 A1* | 1/2011 | Dides | ............... | G06F 3/04812 345/157 |
| 2011/0006978 A1* | 1/2011 | Yuan | ............... | G06F 3/013 345/156 |
| 2011/0170065 A1* | 7/2011 | Sugio | ............... | A61B 5/0496 351/209 |

(Continued)

*Primary Examiner* — Sejoon Ahn
(74) *Attorney, Agent, or Firm* — Ference & Associates LLC

(57) ABSTRACT

An embodiment provides a method, including: detecting, using a gaze tracking system of a device, a position of user gaze with respect to a display; sending, through a display interface, display information including an added visual element associated with the position of user gaze; tracking, using the gaze tracking system, change in the position of user gaze with respect to the display; and moving, using a processor, the added visual element responsive to change in the position of user gaze with respect to the display. Other aspects are described and claimed.

14 Claims, 3 Drawing Sheets

(56) References Cited

U.S. PATENT DOCUMENTS

| | | | |
|---|---|---|---|
| 2011/0298702 A1* | 12/2011 | Sakata | G06F 3/013 345/156 |
| 2012/0032877 A1* | 2/2012 | Watkins, Jr. | G06F 1/1624 345/156 |
| 2012/0096411 A1* | 4/2012 | Nash | G06F 3/04812 715/863 |
| 2012/0157203 A1* | 6/2012 | Latta | G06F 3/005 463/32 |
| 2012/0257035 A1* | 10/2012 | Larsen | G06F 3/017 348/78 |
| 2013/0002551 A1* | 1/2013 | Imoto | G06F 3/013 345/158 |
| 2013/0154913 A1* | 6/2013 | Genc | G06F 3/012 345/156 |
| 2013/0169560 A1* | 7/2013 | Cederlund | G06F 3/013 345/173 |
| 2013/0285951 A1* | 10/2013 | Jeon | G06F 3/0488 345/173 |
| 2014/0043227 A1* | 2/2014 | Skogo | G06F 3/013 345/156 |
| 2014/0092014 A1* | 4/2014 | Srinivasan | G06F 3/013 345/158 |
| 2014/0201674 A1* | 7/2014 | Holz | G06F 3/017 715/782 |
| 2014/0204029 A1* | 7/2014 | Lopez | G06F 3/013 345/163 |
| 2014/0247232 A1* | 9/2014 | George-Svahn | G06F 3/02 345/173 |
| 2014/0266569 A1* | 9/2014 | Yoshikawa | G06F 3/165 340/4.4 |
| 2014/0267010 A1* | 9/2014 | Pasquero | G06T 19/006 345/156 |
| 2014/0270256 A1* | 9/2014 | Yoshikawa | H03G 3/02 381/109 |
| 2014/0344922 A1* | 11/2014 | Lam | G06F 21/629 726/19 |
| 2014/0365903 A1* | 12/2014 | Seo | G06F 3/04883 715/741 |
| 2015/0000025 A1* | 1/2015 | clements | G06F 3/013 4/443 |
| 2015/0019994 A1* | 1/2015 | Freudenthaler | H04M 1/7253 715/748 |
| 2015/0058812 A1* | 2/2015 | Lindh | G06F 3/013 715/863 |
| 2015/0154001 A1* | 6/2015 | Knox | G06F 3/017 345/156 |
| 2015/0193018 A1* | 7/2015 | Venable | G06F 3/0346 345/158 |

\* cited by examiner

EYE TRACKING LASER POINTER

BACKGROUND

Gaze tracking or eye tracking technologies are increasingly being used in or in connection with other electronic devices (e.g., tablets, laptop computers, smart televisions, game consoles, etc.). The gaze tracking system may be used as an input device, e.g., tracking a user's eye focus or gaze focus as in input methodology for executing certain actions, e.g., scrolling of on-screen content, highlighting/selecting of on screen elements with a cursor, etc.

At the same time, users giving presentations, e.g., to an audience in a conference room or auditorium, tend to highlight certain visuals provided in a display (e.g., projection or other main display screen, local screens of the audience, etc.). A typical method involves using a separate laser pointer to add a visual element (e.g., laser pointer dot) to visually highlight certain areas on the main display during a presentation.

BRIEF SUMMARY

In summary, one aspect provides a method, comprising: detecting, using a gaze tracking system of a device, a position of user gaze with respect to a display; sending, through a display interface, display information including an added visual element associated with the position of user gaze; tracking, using the gaze tracking system, change in the position of user gaze with respect to the display; and moving, using a processor, the added visual element responsive to change in the position of user gaze with respect to the display.

Another aspect provides an apparatus, comprising: a display; a display interface; a gaze tracking system that captures image data of a user of the apparatus; a processor operatively coupled to the gaze tracking system; and a memory storing instructions executable by the processor to: detect, using the gaze tracking system, a position of user gaze with respect to the display; send, through the display interface, display information including an added visual element associated with the position of user gaze; tracking, using the gaze tracking system, change in the position of user gaze with respect to the display; and moving the added visual element responsive to change in the position of user gaze with respect to the display.

A further aspect provides a computer program product, comprising: a storage device having code stored therewith and executable by a processor, the code comprising: code that detects, using a gaze tracking system of a device, a position of user gaze with respect to a display; code that sends, through a display interface, display information including an added visual element associated with the position of user gaze; code that tracks, using the gaze tracking system, change in the position of user gaze with respect to the display; and code that moves, using a processor, the added visual element responsive to change in the position of user gaze with respect to the display.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
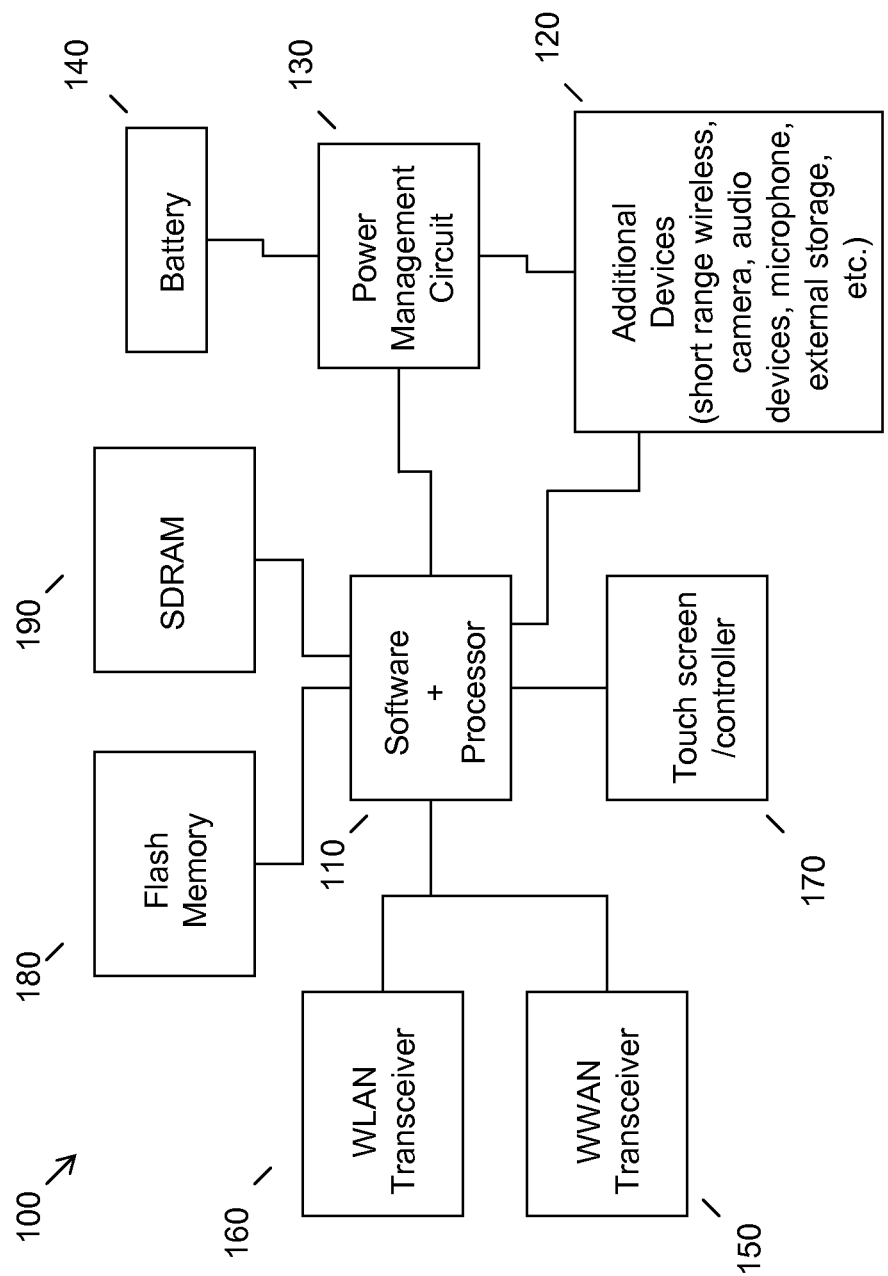
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

When giving a presentation some users will resort to use of additional devices, particularly laser pointers, when trying to highlight data on the screen. However, this requires a user to remember to carry around a laser pointer with them and make sure the batteries are still good, etc. Also, this often requires users to make coordinated hand movements for aiming and operating the laser pointer during a presentation. Many users find this difficult, especially if they are nervous presenting material.

An embodiment therefore assists users by leveraging an eye tracking or gaze tracking system (these terms are used interchangeably) in order to help direct an added visual element on a display, e.g., an animated or virtual laser pointer effect. A "display" may include a screen, display screen, wall, etc., e.g., an object on which a display appears. This reduces the complexity or burden placed on the user such that a visual element may be added to the display, e.g., based on what the user is looking at. This also omits the need for using an additional device such as a dedicated pointer.

An embodiment uses eye tracking techniques on a device or from a presentation display. The system for example may track where the user is looking within the displayed matter (e.g., on their local, personal display and/or on a main display such as a projection screen). Whether tracked from the main display screen or if the user is presenting while in front of a computer, an embodiment may use data from a gaze tracking system (which may be distributed) to determine the user's eye's current location. An embodiment may utilize such information to provide an added visual element such as an animated laser pointer dot to the display screen.

Additional user inputs (either direct and/or inferred) may be used in an embodiment. For example, an embodiment may be configured to utilize gesture inputs (e.g., predetermined gesture(s)) to manage the timing of the display of the added visual element and/or its animation. Thus, by way of example, while pointing at or circling something on the display screen by way of hand gesture, etc., the user could gesture to hold the added visual element (e.g., animated laser pointer) in that location so the user can look away from the screen without the animated added visual element strictly following the user's eye focus at all times. For example, if the user is pointing at something with their eyes, they could then point at it with their finger in order to have the added visual element point hold its location until the user lowers the finger or otherwise clears the hold function, e.g., via added gesture.

An embodiment may also smooth the animated added visual element's movements considering the added visual element is an animation generated by the system. For example, an embodiment may also permit the user to circle with the hand to create a smoother circular motion of animated added visual element than may be possible by using an actual laser pointer. As will be appreciated, other smoothing, directionality or animated effects may be implemented that are advantageous when compared to using an actual laser pointer or other mechanical pointing device (e.g., mouse to move an on-screen cursor).

The illustrated example embodiments will be best understood by reference to the figures. The following description is intended only by way of example, and simply illustrates certain example embodiments.

While various other circuits, circuitry or components may be utilized in information handling devices (also referred to herein as apparatuses, electronic devices, or simply devices), with regard to smart phone and/or tablet circuitry 100, an example illustrated in FIG. 1 includes a system on a circuit design found for example in tablet or other mobile computing platforms. Software and processor(s) are combined in a single circuit 110. Processors comprise internal arithmetic units, registers, cache memory, busses, I/O ports, etc., as is well known in the art. Internal busses and the like depend on different vendors, but essentially all the peripheral devices (120) may attach to a single circuit 110. The circuitry 100 combines the processor, memory control, and I/O controller hub all into a single circuit 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single circuit, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additional devices 120 are commonly included, e.g., a camera that captures image data that may be passed to a gaze tracking system to implement eye tracking, as described herein. System 100 often includes a touch screen 170 for data input and display/rendering. System 100 also typically includes various memory devices, for example flash memory 180 and SDRAM 190.

Figure 2:
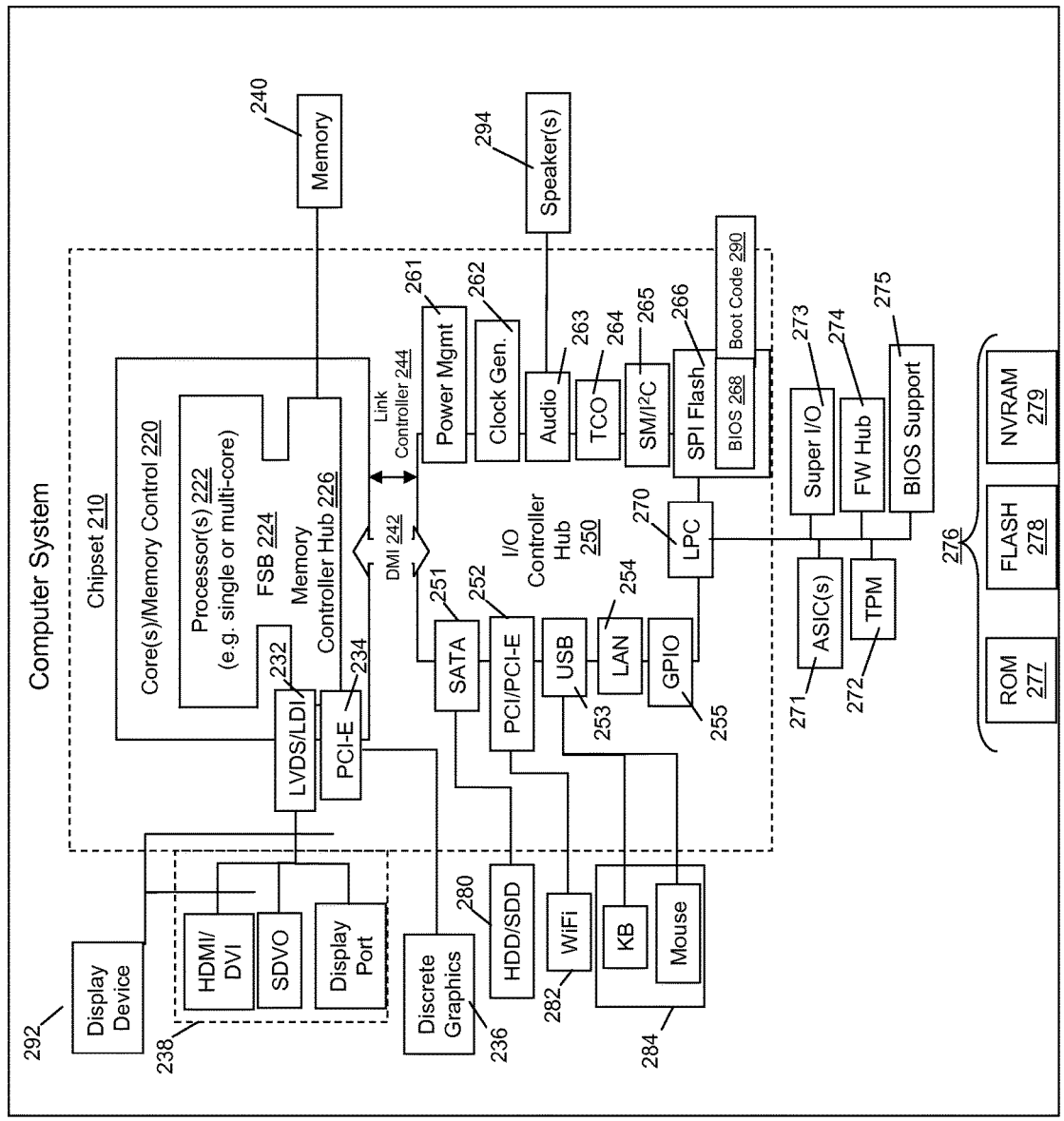
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a LVDS interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Circuitry, as for example outlined in FIG. 1 or FIG. 2, may be used in connection with devices that implement gaze tracking and used for giving visual presentations. Thus, circuitry outlined in FIG. 1 and/or FIG. 2 (or some combination thereof) may be used in a system that includes a gaze tracking system or sub-system. Additionally, devices including circuitry such as outlined in FIG. 1 and/or FIG. 2 may be used to provide visual presentations. For example, the circuitry outlined in FIG. 2 may be used by a user to run a slide presentation that is output to a main display and/or to local displays of other users, e.g., such as users having local displays provided by devices including circuitry outlined in FIG. 1.

Figure 3:
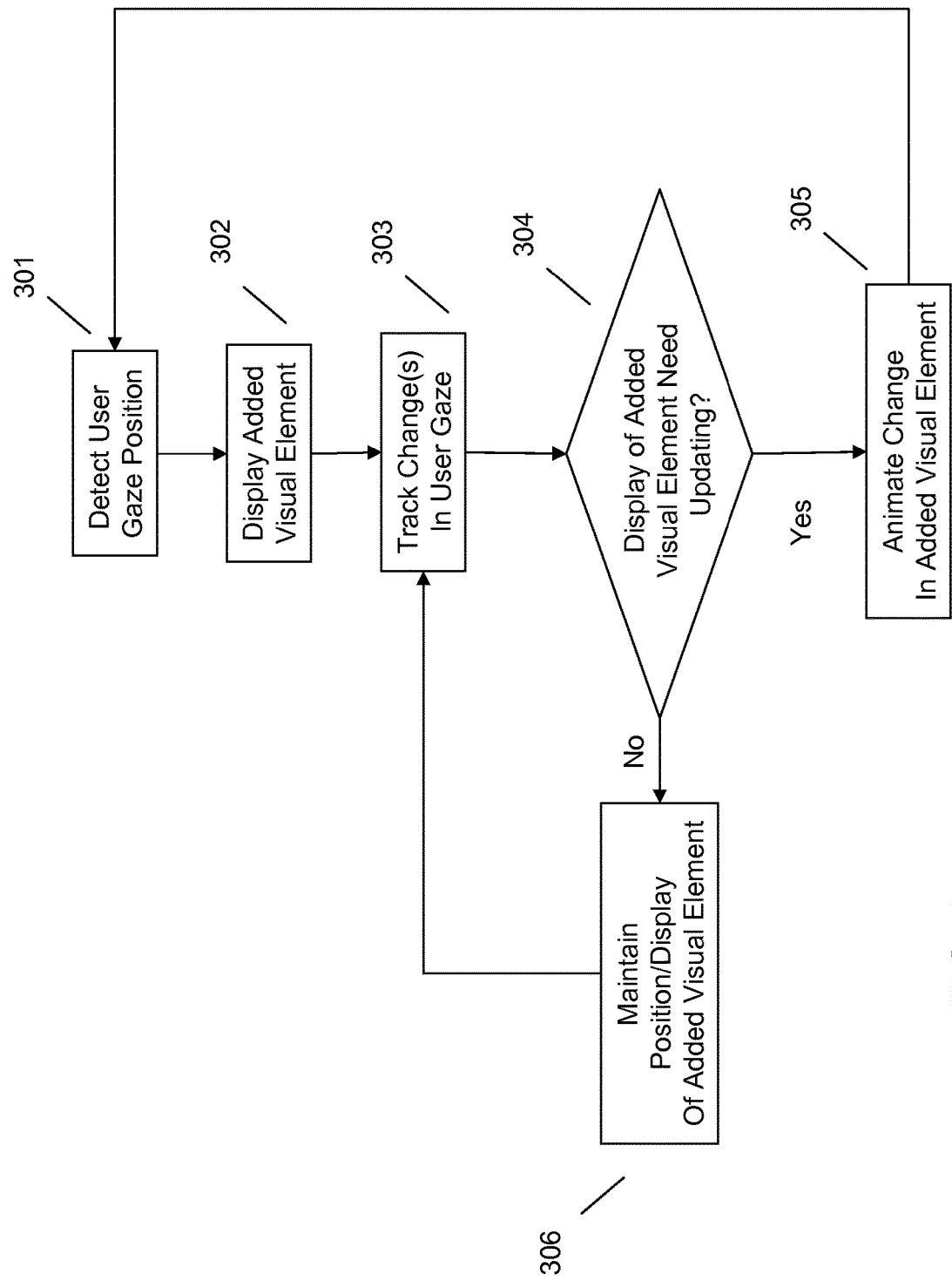
FIG. 3 illustrates an example method for providing an eye tracking laser pointer or like visual element.

Referring to FIG. 3, an embodiment provides a method for providing an eye tracking laser pointer or like visual element. By way of example, an embodiment may provide such an added visual element during a presentation mode and/or in connection with an application that may be used for presenting, e.g., a slide show presentation application. This may be accomplished via sending display data via a display interface to a display, with the display data including the added visual element. This allows a user to provide an added visual element such as a laser pointer dot without needing additional hardware devices.

By way of non-limiting example, at 301 an embodiment will use a gaze tracking system to determine where in the display a user is looking, e.g., to detect a position of user gaze with respect to a display screen. This may be accomplished by employing a camera and gaze tracking system of the user's local device (e.g., at a podium) and/or using a gaze tracking system associated with the main display. In other words, considering the user may look at various displays containing some or all of the displayed material, an embodiment may implement a distributed or coordinated gaze tracking system.

Once the user's focus is initially determined, e.g., at 301 it may be determined that the user is looking at a first bullet point in a list, etc., an embodiment may display an added visual element on the display screen at the position of user gaze at 302. This may or may not occur automatically. For example, rather than providing an added visual element as soon as the user's focus is determined, an embodiment may coordinate the display of the added visual element at 302 with other user input(s), e.g., predetermined gesture input(s). This for example allows a user to control when an added visual element appears on screen. Thus, an embodiment may wait for a predetermined gesture, e.g., a predetermined hand gesture, to be issued or performed by the user prior to displaying the added visual element at 302.

In any event, at some point the added visual element will be added to the display screen, e.g., an animated laser pointer dot, and thereafter an embodiment will continue to track the user using the gaze tracking system. This permits an embodiment to track changes in the user's gaze as illustrated at 303. For example, while the added visual element is displayed on screen, the gaze tracking system may notice that the user has now focused on the second bullet point as illustrated at 303, according to the non-limiting example used herein.

If a change in the user's focus or gaze is determined at 304, e.g., that the user has made a change in what he or she is looking at such that an updating of the added visual element animation is warranted, an embodiment may thereafter animate a change in the added visual element at 305. Otherwise, e.g., if a user holds their eye gaze steady or provides a holding gesture, the added visual element may be maintained in the same position at 306. For example, an embodiment may animate at 305 a movement in the added visual element from the first bullet point to the second bullet point responsive to a user changing focus from the first displayed bullet point to the second displayed bullet point in the display screen.

The change warranting an update in the added visual element, as determined at 304, may take a variety of forms. For example, certain predetermined thresholds may be built into the system such that the added visual element isn't updated in the display too often, e.g., if the user quickly looks away. Similarly, an embodiment may coordinate the animation of changes in the added visual element with other user inputs, e.g., predetermined gesture(s). Thus, an embodiment may utilize the detection of (or lack of detecting) a predetermined gesture at 304 as a factor in determining if a change should be animated for the added visual element at 305 and how that change should be animated.

This permits an embodiment to smooth the animated change of the added visual element such that it matches the user's expectations. A user may tune the system through providing training data or adjusting setting(s) (e.g., predetermined threshold(s) and/or gesture(s)/input(s) needed to implement changes in the animation of the added visual element). Other smoothing of the animation may be provided as well.

For example, an embodiment may implement a line or curve fitting algorithm to smooth the movement of the animated change of the added visual element. Other smoothing of the animated change may be implemented. For example, an embodiment may implement a directionality or other smoothing, e.g., based on the content of the display screen, underlying applications, etc. By way of example, if progressing through a list, an embodiment may smooth the animation of the change from a first list item to a second list item using a predetermined speed, direction, etc., for implementing the animation of the visual element. As another example, the animated movement of the added visual element may be continuous or discontinuous, e.g., disappearing and reappearing, and combinations thereof. Moreover, certain eye movements may be disregarded or dampened by an embodiment. For example, if a user has a chat window open as well as a presentation application open, an embodiment may disregard eye tracking data that maps the user's focus to the open chat window such that the added visual element will not repeatedly transition to this location.

An embodiment therefore allows an added visual element, e.g., an animated laser pointer dot, a visual highlighting, etc., to be automatically provided using data available from a gaze tracking system. Again the gaze tracking system may be local to the presenting user's device and/or distributed. In a distributed system, a user's gaze tracking data across displays (e.g., local and main) may be coordinated to offer a continuity of inputs with respect to animation of the added visual element. Moreover, an added visual element may be displayed locally for the user, on a main display, and/or on the local displays of participating users.

An embodiment thus allows for a convenient display of an added visual element during presentations. This frees the user from needing to carry and master the use of additional hardware, such as a laser pointer. The various embodiments also may implement smoothing or other techniques such that the jumpiness associated with traditional laser pointers is not replicated due to jumpiness in the eye movement of a user.

As will be readily understood, since the animation of the added visual element may be coordinated with other inputs, e.g., gesture inputs, the user may control the animation in terms of its appearance and movement, as well as adding to the animation, e.g., adding additional animated elements such as animated circling or visual distinguishing of on screen elements using gestures, etc.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   detecting, using a gaze tracking system of a device, a position of user gaze with respect to a display;
   sending, through a display interface, display information including an added visual element associated with the position of user gaze, wherein the added visual element comprises an indicator associated with the position of user gaze;
   tracking, using the gaze tracking system, change in the position of user gaze with respect to the display;
   moving, using a processor, the added visual element responsive to change in the position of user gaze with respect to the display, wherein the moving comprises a discontinuous animated tracking movement of the added visual element on the display according to data provided by the gaze tracking system;
   detecting a predetermined hand gesture that does not comprise touch contact with the device; and
   decoupling, in response to the predetermined hand gesture, movement of the added visual element from the user gaze for a duration until the user ceases the predetermined hand gesture, wherein the decoupling maintains the added visual element in a last known position associated with the position of user gaze based upon detecting the predetermined hand gesture.

2. The method of claim 1, wherein the sending of the added visual element is controlled according to the predetermined hand gesture.

3. The method of claim 1, wherein said sending and said moving occur in a presentation mode.

4. The method of claim 1, wherein the gaze tracking system of is co-located with the display.

5. The method of claim 1, wherein the added visual element is a laser pointer indication.

6. The method of claim 1, wherein the moving comprises a smoothed animated tracking movement of the added visual element on the display according to data provided by the gaze tracking system.

7. The method of claim 1, wherein the animated tracking movement is controlled according to one or more underlying applications being utilized.

8. An apparatus, comprising:
a display;
a display interface;
a gaze tracking system that captures image data of a user of the apparatus;
a processor operatively coupled to the gaze tracking system; and
a memory storing instructions executable by the processor to:
detect, using the gaze tracking system, a position of user gaze with respect to the display;
send, through the display interface, display information including an added visual element associated with the position of user gaze, wherein the added visual element comprises an indicator associated with the position of user gaze;
track, using the gaze tracking system, change in the position of user gaze with respect to the display;
move the added visual element responsive to change in the position of user gaze with respect to the display, wherein the moving comprises a discontinuous animated tracking movement of the added visual element on the display according to data provided by the gaze tracking system;
detect a predetermined hand gesture that does not comprise touch contact with the device; and
decouple, in response to the predetermined hand gesture, movement of the added visual element from the user gaze for a duration until the user ceases the predetermined hand gesture, wherein the instructions to decouple comprises instructions to maintain the added visual element in a last known position associated with the position of user gaze based upon detecting the predetermined hand gesture.

9. The apparatus of claim 8, wherein the added visual element is controlled according to the predetermined hand gesture.

10. The apparatus of claim 8, wherein sending and moving of the added visual element occur in a presentation mode.

11. The apparatus of claim 8, wherein the gaze tracking system of is co-located with the display.

12. The apparatus of claim 8, wherein the added visual element is a laser pointer indication.

13. The apparatus of claim 8, wherein moving of the added visual element comprises a smoothed animated tracking movement of the added visual element on the display according to data provided by the gaze tracking system.

14. A computer program product, comprising:
a storage device having code stored therewith and executable by a processor, the code comprising:
code that detects, using a gaze tracking system of a device, a position of user gaze with respect to a display;
code that sends, through a display interface, display information including an added visual element associated with the position of user gaze, wherein the added visual element comprises an indicator associated with the position of user gaze;
code that tracks, using the gaze tracking system, change in the position of user gaze with respect to the display;
code that moves, using a processor, the added visual element responsive to change in the position of user gaze with respect to the display, wherein the moving comprises a discontinuous animated tracking movement of the added visual element on the display according to data provided by the gaze tracking system;
code that detects a predetermined hand gesture that does not comprise touch contact with the device; and
code that decouples, in response to the predetermined hand gesture, movement of the added visual element from the of user gaze for a duration until the user ceases the predetermined hand gesture, wherein the code that decouples comprises code that maintains the added visual element in a last known position associated with the position of user gaze based upon detecting the predetermined hand gesture.

* * * * *